United States Patent
Buckland et al.

(10) Patent No.: US 9,548,808 B2
(45) Date of Patent: Jan. 17, 2017

(54) DYNAMIC OPTICAL CHANNEL SPARING IN AN INDUSTRY STANDARD INPUT/OUTPUT SUBSYSTEM

(71) Applicant: International Business Machines Corporation, Armonk, NY (US)

(72) Inventors: Patrick A. Buckland, Austin, TX (US); Daniel M. Dreps, Georgetown, TX (US); Nanju Na, San Jose, CA (US); Suzanne M. Nolen, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 67 days.

(21) Appl. No.: 14/538,118

(22) Filed: Nov. 11, 2014

(65) Prior Publication Data
US 2016/0134362 A1   May 12, 2016

(51) Int. Cl.
*H04B 10/038* (2013.01)
*H04Q 11/00* (2006.01)
*H04L 12/40* (2006.01)
*H04L 12/707* (2013.01)

(52) U.S. Cl.
CPC ....... *H04B 10/038* (2013.01); *H04L 12/40182* (2013.01); *H04L 45/22* (2013.01); *H04Q 11/0066* (2013.01); *H04Q 2011/0081* (2013.01)

(58) Field of Classification Search
None
See application file for complete search history.

(56) References Cited

U.S. PATENT DOCUMENTS

| | | | |
|---|---|---|---|
| 6,466,539 B1 | 10/2002 | Kramer et al. | |
| 6,590,755 B1 | 7/2003 | Behr et al. | |
| 6,910,089 B2 | 6/2005 | deBlanc et al. | |
| 7,111,084 B2 | 9/2006 | Tan et al. | |
| 7,281,169 B2 | 10/2007 | Golasky et al. | |

(Continued)

OTHER PUBLICATIONS

Krishnamurthy, Harini et al., "Restoration mechanisms for handling channel and link failures in optical WDM networks: tunable laser-based switch architectures and performance analysis", Computer Communications, vol. 28 Issue 9, Jun. 2005, pp. 987-999.

(Continued)

*Primary Examiner* — Darren E Wolf
(74) *Attorney, Agent, or Firm* — Stephen J. Walder, Jr.; Stephen L. Bennett

(57) ABSTRACT

Mechanisms, in a data processing system comprising an input/output subsystem implementing an industry standard optical bus, for handling a failure of an optical channel in an optical bus are provided. The mechanisms detect, by failure detection logic of the input/output (I/O) subsystem, failure of an optical channel of the optical bus. The mechanisms send, by a controller of the I/O subsystem, a control signal to channel routing logic of the I/O subsystem to control a routing of data signals between active bus lanes of the data processing system and optical channels of the optical bus in response to detecting the failure of the optical channel. The mechanisms control, by the channel routing logic, routing of data signals between the active bus lanes and the optical channels so as to remove the failed optical channel from further use and use a spare optical channel instead of the failed optical channel.

13 Claims, 7 Drawing Sheets

(56) References Cited

U.S. PATENT DOCUMENTS

| | | | |
|---|---|---|---|
| 7,861,113 | B2 | 12/2010 | Wang |
| 7,895,374 | B2 | 2/2011 | Ferraiolo et al. |
| 8,194,533 | B2 | 6/2012 | Johansson et al. |
| 8,305,879 | B2 | 11/2012 | Gregg |
| 8,845,980 | B2 | 9/2014 | Asogawa et al. |
| 8,874,974 | B2 | 10/2014 | Griffith et al. |
| 2010/0005202 | A1 | 1/2010 | Ferraiolo et al. |
| 2010/0005335 | A1 | 1/2010 | Ferraiolo et al. |
| 2012/0082458 | A1* | 4/2012 | Bouda ............ H04J 14/0221 398/69 |

OTHER PUBLICATIONS

"List of IBM Patents or Patent Applications Treated as Related", Jun. 4, 2015, 2 pages.

"Quality & Reliability: 850 nm VCSE Products Optoelectronics Reliability Study", Finisar Corporation, Advanced Optical Components Division, 2007, 8 pages.

Conley, Reginald, "PCI Express over Optical Cabling: Performance, Simplicity, Efficiency", Network World, Mar. 1, 2012, available at http://www.networkworld.com/article/2186464/tech-primers/pci-express-over-optical-cabling--performance--simplicity--efficiency.html, 4 pages.

Doumith, Elias A. et al., "On Failure Localization in Optical Networks", Institut Telecom, Networks and Computers Sciences Department, Keio University—Telecom ParisTech joint workshop on Future Internet, Wednesday, Sep. 29, 2010, 6 pages.

Krishnamurthy, Harini et al., "Restoration mechanisms for handling channel and link failures in optical WDM networks: tunable laser-based switch architectures and performance analysis", Computer Communications, vol. 28 Issue 9, Jun. 2005, pp. 987-999 (Abstract submitted).

Verdiell, Marc, "Implementing PCIe on Optical Links", Samtec Optical Group, PCI-SIG Developers Conference, 2012, 20 pages.

* cited by examiner

| FAILED/ FAILING OPTICAL CHANNEL # | OPTICAL CHANNEL USAGE | | | | | | | | | MUX SELECTION SETTING [SEL0..SEL7] |
|---|---|---|---|---|---|---|---|---|---|---|
| | CH0 | CH1 | CH2 | CH3 | CH4 | CH5 | CH6 | CH7 | CH8 | |
| NONE | X | L0 | L1 | L2 | L3 | L4 | L5 | L6 | L7 | 1111 1111 |
| 9 | L0 | L1 | L2 | L3 | L4 | L5 | L6 | L7 | X | 0000 0000 |
| 8 | L0 | L1 | L2 | L3 | L4 | L5 | L6 | X | L7 | 0000 0001 |
| 7 | L0 | L1 | L2 | L3 | L4 | L5 | X | L6 | L7 | 0000 0011 |
| 6 | L0 | L1 | L2 | L3 | L4 | X | L5 | L6 | L7 | 0000 0111 |
| 5 | L0 | L1 | L2 | L3 | X | L4 | L5 | L6 | L7 | 0000 1111 |
| 4 | L0 | L1 | L2 | X | L3 | L4 | L5 | L6 | L7 | 0001 1111 |
| 3 | L0 | L1 | X | L2 | L3 | L4 | L5 | L6 | L7 | 0011 1111 |
| 2 | L0 | X | L1 | L2 | L3 | L4 | L5 | L6 | L7 | 0111 1111 |

SELX = "LOW" OR "0" TO SWITCH TO PORT "B"

SELX = "HIGH" OR "1" TO SWITCH TO PORT "C"

FIG. 7

DYNAMIC OPTICAL CHANNEL SPARING IN AN INDUSTRY STANDARD INPUT/OUTPUT SUBSYSTEM

BACKGROUND

The present application relates generally to an improved data processing apparatus and method and more specifically to mechanisms for dynamic segment sparing and repair in an input/output subsystem.

Overall computer system performance is affected by each of the key elements of the computer structure, including the performance/structure of the processor(s), any memory cache(s), the input/output (I/O) subsystem(s), the efficiency of the memory control function(s), the main memory device(s), and the type and structure of the memory interconnect interface(s). Extensive research and development efforts are invested by the industry, on an ongoing basis, to create improved and/or innovative solutions to maximizing overall system performance and density by improving the input/output system/subsystem design and/or structure. High-availability systems present further challenges as related to overall system reliability due to customer expectations that new computer systems will markedly surpass existing systems in regard to mean-time-between-failure (MTBF), in addition to offering additional functions, increased performance, increased storage, lower operating costs, etc. Other frequent customer requirements further exacerbate the system design challenges, and include such items as ease of upgrade and reduced system environmental impact (such as space, power and cooling).

SUMMARY

In one illustrative embodiment, a method, in a data processing system comprising an input/output subsystem implementing an industry standard optical bus, for handling a failure of an optical channel in the industry standard optical bus is provided. The method comprises detecting, by failure detection logic of the input/output (I/O) subsystem of the data processing system, a failure of an optical channel of the industry standard optical bus. The method further comprises sending, by a controller of the I/O subsystem, a control signal to channel routing logic of the I/O subsystem to control a routing of data signals between active bus lanes of the data processing system and optical channels of the industry standard optical bus in response to detecting the failure of the optical channel. Moreover, the method comprises controlling, by the channel routing logic of the I/O subsystem, routing of data signals between the active bus lanes and the optical channels so as to remove the failed optical channel from further use and use a spare optical channel instead of the failed optical channel.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 7 is an example of an optical channel usage table and corresponding multiplexer select control signal for various optical channel failures in accordance with one illustrative embodiment.

DETAILED DESCRIPTION

Figure 1:
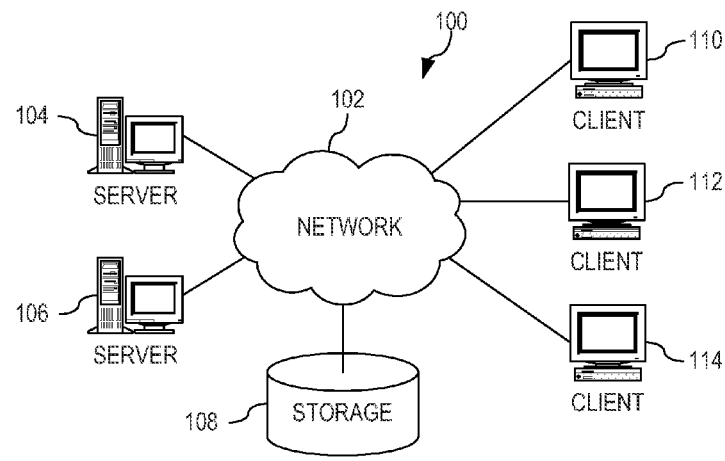
FIG. 1 is an example diagram of a distributed data processing system in which aspects of the illustrative embodiments may be implemented.

System performance and bus speeds continue to increase, often exceeding more than double the system performance and bus speeds from one system generation to another, while high speed bus design space utilization requirements shrink rapidly in copper link-based systems. This limits architecture configuration options since reliable communication over such high speed buses often limit the length of the copper wiring that may be utilized.

Moreover, industry standard buses utilizing copper links, such as Peripheral Component Interconnect (PCI) and PCI Express (PCIe) buses, are not tolerant of lane or channel (point-to-point data communication links) failures due to the fixed lane configurations of the protocols employed. That is, with industry standard buses, the point-to-point data communication links and corresponding protocols are designed such that if there is a lane failure, the bus automatically reduces its bandwidth to half of the previous bandwidth. For example, in a 32 bit bus, i.e. an x32 bus having 32 lanes (copper wires providing point-to-point data communication links), if a lane fails, the bandwidth of the bus is reduced to a 16 bit bus bandwidth. If additional lane failures occur, the bandwidth is subsequently reduced by half again, e.g., from 16 to 8 bit bus bandwidth, from 8 to 4 bit bus bandwidth, and so on. Thus, even when there is a single lane failure, the bandwidth of the bus is significantly reduced.

To address such issues in memory systems, mechanisms have been developed for performing dynamic segment sparing and repair in memory systems. Examples of such mechanisms are described in U.S. Pat. No. 7,895,374 entitled "Dynamic Segment Sparing and Repair in a Memory System", U.S. Patent Application Publication No. 2010/0005335 entitled "Microprocessor Interface with Dynamic Segment and Repair", and U.S. Patent Application Publication No. 2010/0005202 entitled "Dynamic Segment Sparing and Repair in a Memory System," all of which are assigned to the same assignee as the present application, i.e. International Business Machines (IBM) Corporation of Armonk, N.Y., and have common inventors to the present application.

U.S. Pat. No. 7,895,374 and U.S. Patent Application Publication No. 2010/0005202 provide a communication interface device, system, method, and design structure for providing dynamic segment sparing and repair in a memory system. The communication interface device includes drive-side switching logic including driver multiplexers to select driver data for transmitting on link segments of a bus, and receive-side switching logic including receiver multiplexers to select received data from the link segments of the bus. The bus includes multiple data link segments, a clock link segment, and at least two spare link segments selectable by the drive-side switching logic and the receive-side switching logic to replace one or more of the data link segments and the clock link segment.

U.S. Patent Application Publication No. 2010/0005335 provides a processing device, system, method, and design structure for providing a microprocessor interface with dynamic segment sparing and repair. The processing device includes drive-side switching logic including driver multiplexers to select driver data for transmitting on link segments of a bus, and receive-side switching logic including receiver multiplexers to select received data from the link segments of the bus. The bus includes multiple data link segments, a clock link segment, and at least two spare link segments selectable by the drive-side switching logic and the receive-side switching logic to replace one or more of the data link segments and the clock link segment.

While these publications describe mechanisms for using data link segment sparing and switching logic for replacing data link segments, these mechanisms are limited to proprietary bus configurations using convention wire link based buses and are not generally applicable to generalized industry standard bus configurations or bus technologies that are not based on the convention wire link configurations, e.g., optical buses that utilize optical channels. For example, these prior art mechanisms are not able to be implemented with optical busses configured in accordance with industry standards such as Peripheral Component Interconnect (PCI) or PCI Express (PCIe) configuration and protocol standards. The industry standard busses have a legacy of allowing bandwidth reduction when a fault occurs. The protocol layer controls this design aspect and do to the vast use conditions it cannot be changed. Where bandwidth is key metric, and constant bandwidth is required, as in large Symmetric Multiprocessor (SMP) systems, this allowance is not acceptable. The illustrative embodiments add an additional layer of hardware and protocol that adapts the industry standard busses, e.g., industry standard PCI-e busses, to allow constant bandwidth in the event of lane failures, e.g., a single lane failure in an X8 link, two faults in an X16 link (one in lower byte and one in upper byte), etc.

In order to extend architectural configuration options and the architecture design space, optical links are employed in major buses, including proprietary and industry standard input/output (I/O) buses, such as PCI and PCIe buses. Such optical links utilize lasers and optics components to communicate data over optical links which essentially replace the copper connections in traditional copper based bus architectures. These optical links are not limited to the same length restrictions as copper links and thus, can be used in architectures where longer data communication links are needed.

However, with laser based optical link architectures, system reliability is exposed to higher failure in time (FIT) rates from laser failures compared to copper links, i.e. optical links fail more often than copper links. This is primarily due to failure of the lasers. That is, the lasers of an optical bus are sensitive to temperatures and thus, excessive thermal stress will cause lasers of an optical bus to fail. This sensitivity to thermal stress is illustrated in FIG. 1 where a plot of the mean time to failure (MTTF) versus junction temperature is shown (where the junction refers to the substrate material that composes the sandwich assembly of the device). As shown in FIG. 1, the MTTF reduces as the temperature increases.

When optical components are used to implement an industry standard bus, such as a PCI or PCIe bus, while this provides the benefit of increased architectural options, the increased failure rates of the optical components in combination with the lack of robustness of the bus protocol may lead to decreased system performance when there is a lane failure, which may occur more often due to the optical components. That is, an optical PCI bus will experience more frequent lane failures and when there is a lane failure, the system employing the optical PCI bus will experience reduced bandwidth as discussed above due to the fact that the industry standard bus does not provide any spare lanes or spare lane control. This bandwidth reduction may be more than half at a single laser failure depending on the lane number of the failure. This essentially forces the system to waste a large number of working lanes and significantly reduces the bandwidth. This in turn leads to poor system reliability and performance. Ultimately, this requires a complete replacement or repair of the failing component in the computing device, requiring additional costs to maintain the operational status of the computing device.

The illustrative embodiments provide mechanisms for performing optical channel sparing in industry standard high speed optical busses, such as an optical PCI or PCIe bus. It should be appreciated that the term "channel" as used herein refers to the physical properties of the packaging connection from device A to device B while the term "lane" refers to a logical naming convention, such as X8 is 8 lanes while X16 is 16 lanes. The signals of a lane are transmitted from device A to device B via a channel interface.

The optical channel sparing of the illustrative embodiments allows the bandwidth of the industry standard high speed optical bus to be maintained even in the event of a channel (lane) failure. This allows the system to maintain reliability and provides cost savings by reducing costly optical module replacement. A minimal cost is required to provide additional spare optical channels, failure detection mechanisms, and channel switching hardware. Failure of an optical channel may be performed by monitoring laser power and bias current alarms as well as monitored per-channel data from registers associated with the channels. In the event of a detected failure, or imminent failure, by the monitoring and detection mechanisms of the illustrative embodiments, the failing optical channel may be removed and channel sparing is performed to switch the operation of the bus to utilize the working channels and the spare channel.

The channel sparing mechanisms of the illustrative embodiments may be implemented, for example, as an added hardware feature in a serializer/deserializer (SerDes) circuit, as part of an optical transceiver module, in a printed circuit board (PCB) using low-cost passive multiplexer components as switching devices, in a field programmable gate array (FPGA) providing a service controller for failure detection reconfiguration control, in system firmware, or the like. It should be appreciated that while the channel sparing mechanisms of the illustrative embodiments will be described with regard to the channel sparing supporting a single channel failure, the mechanisms of the illustrative embodiments may be extended to any number of channel failures. That is, depending on the number of spare channels provided, different numbers of channel failures are able to be handled by the channel sparing mechanisms of the illustrative embodiments, e.g., 2 or more spare channels permit the mechanisms of the illustrative embodiments to handle 2 or more channel failures while maintaining bandwidth and system performance.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Aspects of the present invention may be implemented as a system, a method, and/or a computer program product. With regard to a computer program product, the failure detection and channel sparing control mechanisms may be implemented as computer program products with the code of these computer program products being implemented or executed by hardware in a computing system, e.g., a processor. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
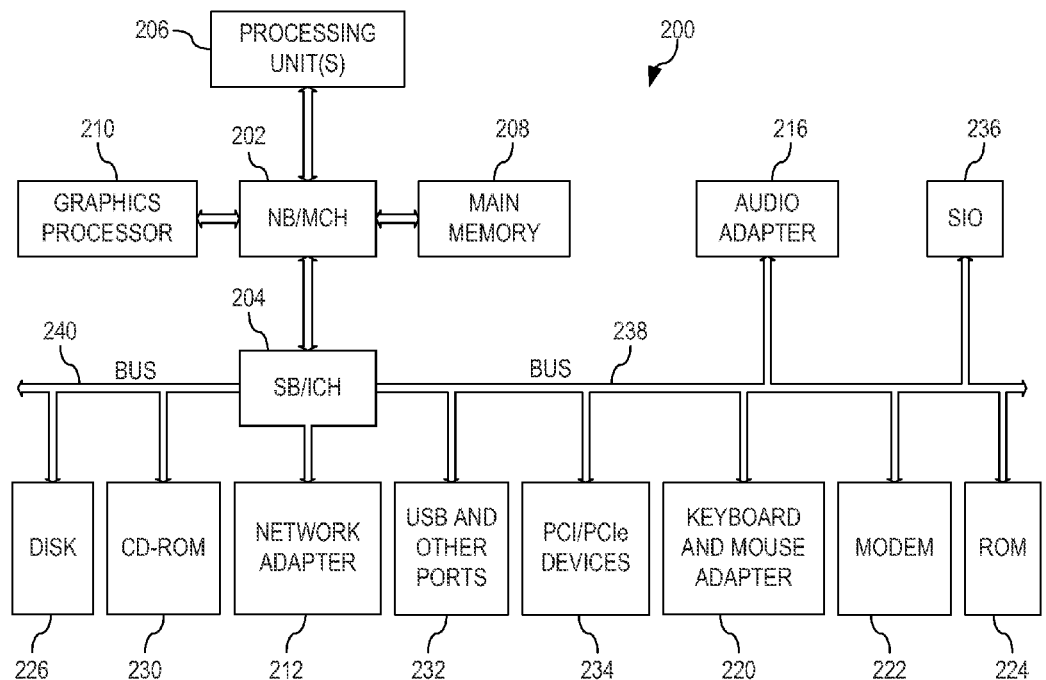
FIG. 2 is an example block diagram of a computing device in which aspects of the illustrative embodiments may be implemented.
Figure 3:
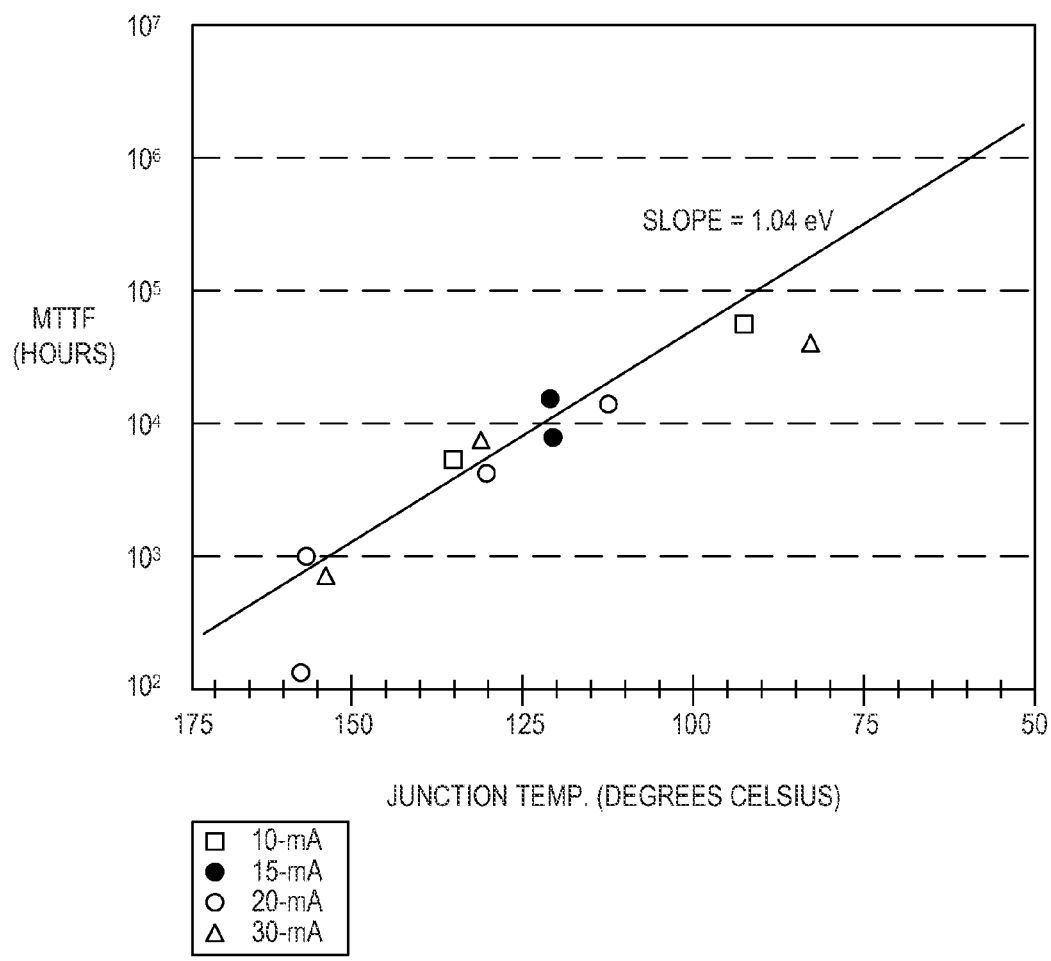
FIG. 3 is an example plot illustrating increased failure rates for optical links.

The illustrative embodiments may be utilized in many different types of data processing environments which may implement industry standard optical buses that utilize channel sparing. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System P® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

As shown in FIG. 2 above, the data processing system 200 implements busses 238 and 240 which may be implemented as industry standard busses, such as PCI or PCIe busses. In some architectures, these busses may be implemented using optical busses for connection to other data processing systems, other processors on a single data processing system, or other computing elements on the same or different data processing systems. These optical busses implement an industry standard, e.g., a PCIe, to thereby provide the industry standard optical bus, e.g., PCI or PCIe optical bus, having fiber optic links, lasers, and other optics components, for communicating data between data processing systems, processors on a single data processing system, or other computing elements on the same or different data processing systems.

In accordance with the illustrative embodiment, these industry standard optical busses are augmented to include the channel sparing mechanisms of the illustrative embodiments. Thus, when there is a detected failure of a channel in the bus 238 or 240, or detection of an imminent failure of a channel in the bus 238 or 240, channel sparing is initiated to cause the failed or failing channel to be removed from further use and a spare channel to be utilized in its stead. This allows the bus 238 or 240 to continue to operate with the same bandwidth even when there is a channel failure.

Figure 4:
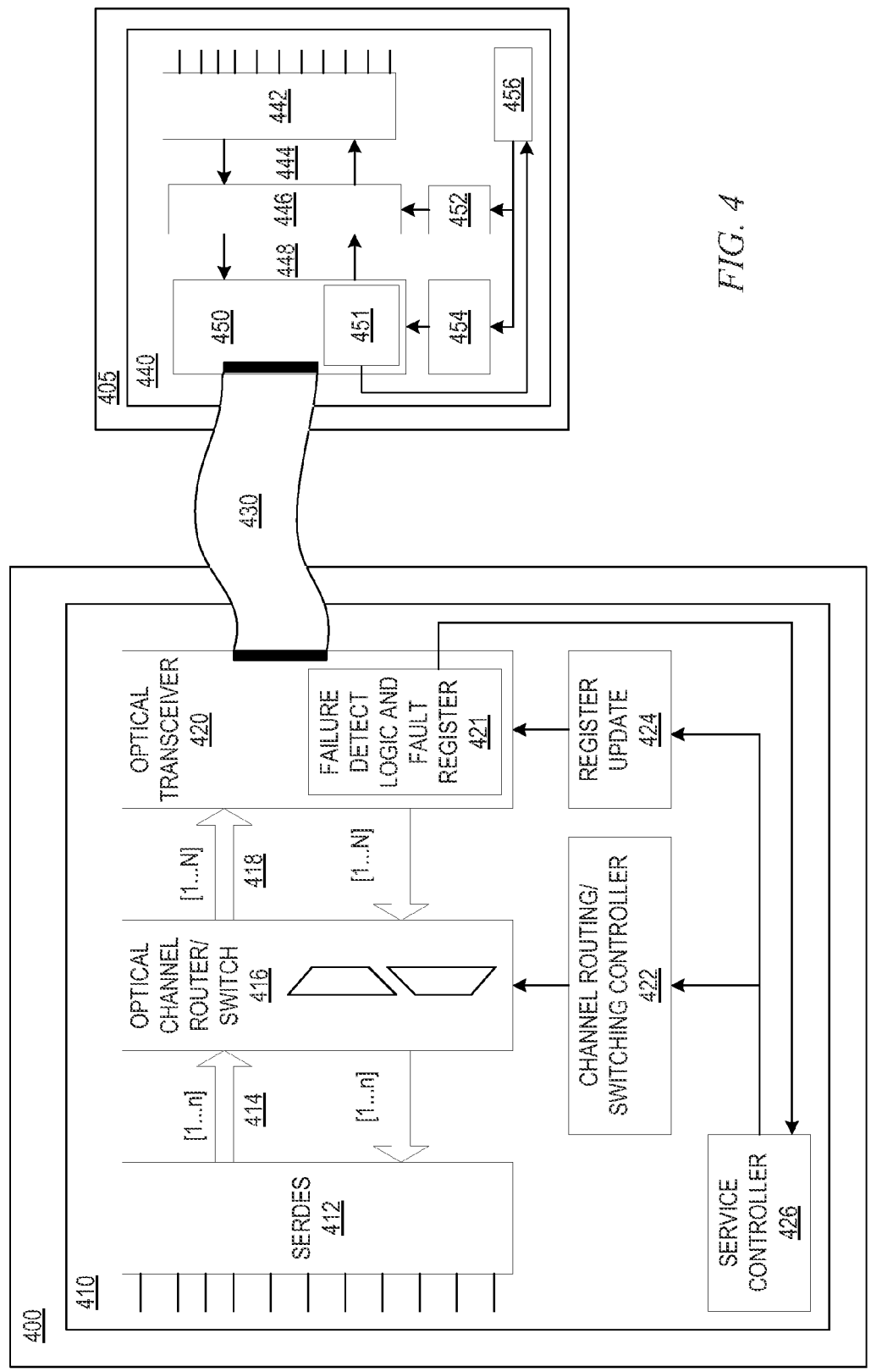
FIG. 4 is an example block diagram illustrating the primary operational components of an optical channel sparing mechanism in accordance with one illustrative embodiment.

FIG. 4 is an example block diagram illustrating the primary operational components of an optical channel sparing mechanism in accordance with one illustrative embodiment. As shown in FIG. 4, an input/output subsystem 410 of a first system enclosure 400 (e.g., a drawer, rack, etc.) comprises a serializer/deserializer (SerDes) 412 (used to take a wide bus having a relatively large number of lanes and serialize them to a smaller number of lanes, or vice versa), a plurality of active bus lanes 1 to n (where n is the total number of active bus lanes) 414, an optical channel router/switch 416, a plurality of optical channels 1 to N 418 (where N is the total number of optical channels), an optical transceiver 420, a channel routing/switching controller 422, a register update 424, and a service controller 426. Similar elements are provided in the I/O subsystem 440 of second system enclosure 405 as elements 442-456. The optical transceivers 420 and 450 of the two I/O subsystems 410 and 440 are coupled to one another via optical fiber 430. It should be appreciated that inside the optical module is a fault register 421 that is accessible via a control bus. When a laser of an optical channel fails, for example, this fault register will go active on the failing lane, i.e. will indicate which optical channel has failed or for which there is an imminent failure. This fault register 421 is monitored by the service controller 426 to detect faults of the optical channels.

The optical transceivers 420 and 450 operate to send and receive data via optical fiber 430 using lasers and other optical components. The data that is received/transmitted by these optical transceivers 420 and 450 is passed through optical channels 418 and 448, respectively and through the corresponding optical channel router/switch 416 and 446. The number of optical channels 418 and 448 are preferably include one or more spare optical channels. Thus, the number of optical channels N may be one or more greater than the number of active bus lanes n. That is, if L is the number of spare optical channels, then N=n+L.

Because of the optical nature of the channels 418 and 448, and the implementation of optics by the optical transceivers 420 and 450, the optical channels 418 and 448 may experience a failure, such as due to excessive thermal stress on a corresponding laser of the optical channel in optical channels 418 or 448. The optical transceivers 420 and 450 implement failure detection logic 421 and 451, respectively, to monitor the optical components of the optical transceivers 420 and 450, respectively, to determine if a failure of an optical channel has occurred or is imminent. For example, the failure detection logic 421, 451 may monitor laser power and bias current alarms, as well as, or alternatively, monitor per-channel data from registers associated with the optical channels. For example, if the laser power falls below a predetermined threshold, then a failure may be detected or detected to be imminent. If a bias current alarm is generated, then a failure of the optical channel has occurred or is imminent. In the event of a detected failure, or imminent failure, by the failure detection logic 421, 451 sends a signal to the service controller 426, 456 to inform the service controller 426, 456 of the failure/imminent failure of the optical channel and to inform the service controller 426, 456 of which optical channel has failed or is failing.

In response to receiving a signal from the failure detection logic 421, 451 of the optical transceivers 420, 450, the service controller 426, 456 sends control signals to the channel routing/switching controller 422, 452 and the register update logic 424, 454. The control signals cause the channel routing/switching controller 422, 452 to isolate and remove the failed or failing optical channel from further use and rearrange the optical bus channel order to include one or more of the spare optical channels. The control signals sent to the register update logic 424, 454 cause the registers of the optical channels to be updated. That is, the service controller 426 loads the effective mux selection code into the update register logic 424, 454. If a fault occurs the corresponding lane is known and there is a table look-up of the new selection code to shift the paths of the muxes to steer around and failed lane. As a result, the data flowing to/from the SerDes 412, 442 via the active bus lanes 414, 444 through the channel router/switch 416 and 446 is routed through the working optical channels and the one or more spare optical channels. Thus, there is no loss in bandwidth of the optical bus.

It should be appreciated that, in the depicted example, the channel router/switch 416, 446 is implemented as multiplexer circuitry external to the SerDes 412, 442, the optical channels 418, 448 and the optical transceivers 420, 450. In such an embodiment, the multiplexer circuitry and other circuitry of the channel router/switch 416, 446 may be implemented as passive multiplexers in a printed circuit board (PCB). Alternatively, the channel router/switch 416, 446 may be integrated with one of the SerDes 412, 442, or the optical transceivers 420, 450. One or more of the service controller logic 426, 456, channel routing/switching controller logic 422, 452, and/or the register update logic 424, 454 may be implemented using a field programmable gate array (FPGA), system firmware, or software executed by one or more processors or the like.

Figure 5:
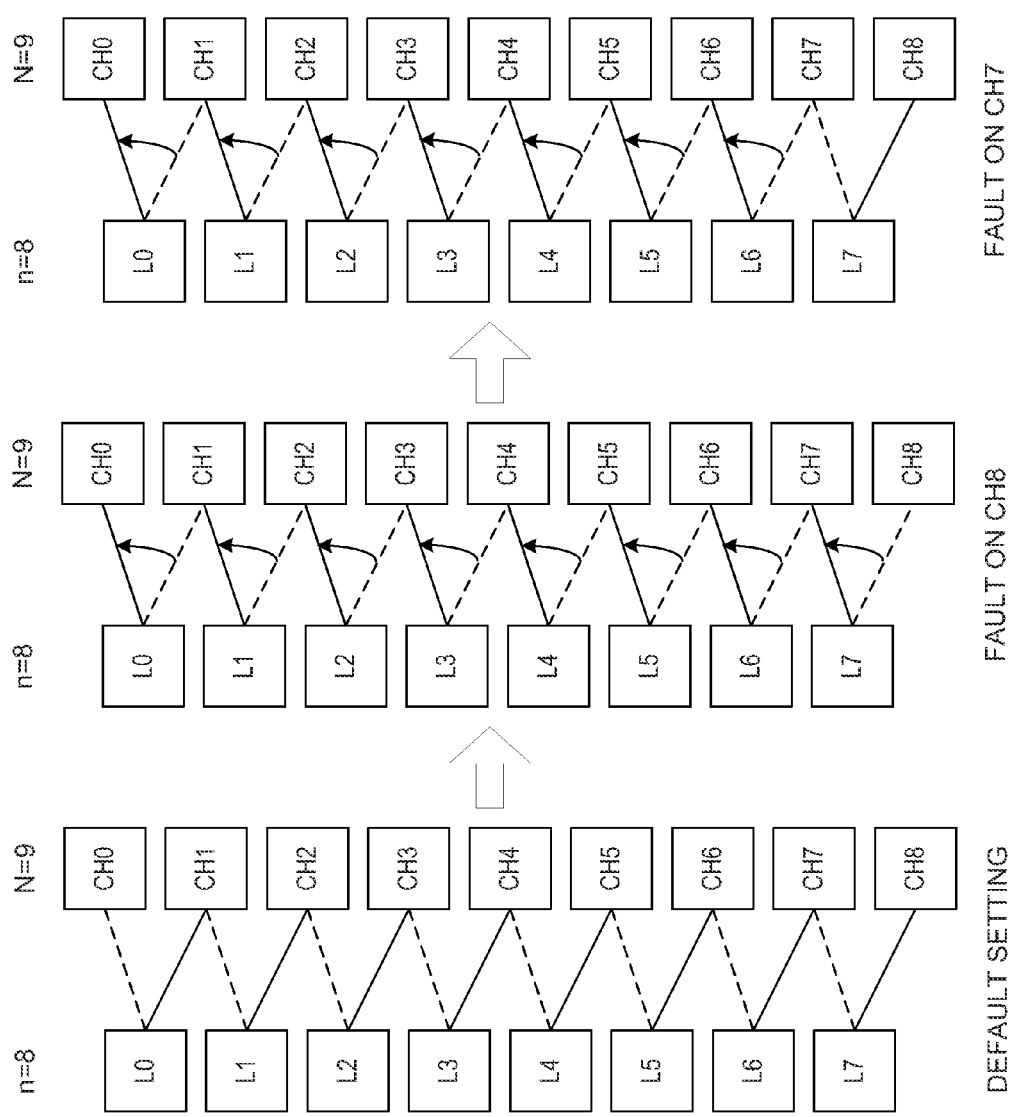
FIG. 5 is an example block diagram illustrating a spare channel routing/switching operation in accordance with one illustrative embodiment.

FIG. 5 is an example block diagram illustrating a spare channel routing/switching operation in accordance with one illustrative embodiment. As shown in FIG. 5, each bus lane L0-L7 is provided with a plurality of channel paths (optical channels) ch0-ch8 to/from the optical transceiver. Initially, the bus lanes are routed to, and connected to, their corresponding default channels by the channel router/switch 416, 446. Thus, initially, lane L0 is routed to/connected to optical channel ch1 but also has a possible optical path to the optical transceiver via optical channel ch0 which serves as a spare optical channel in this example embodiment. Initially, lane L1 is routed to/connected to optical channel ch2, lane L2 is routed to/connected to optical channel ch3, and so on.

In the event of a failure, or imminent failure, of optical channel ch8 being detected and the failure/imminent failure being communicated to the service controller 426, 456, the service controller 426, 456 sends a control signal to the channel router/switch 416, 446 to cause the channel router/switch 416, 446 to re-route or switch lane associations with optical channels so as to isolate and remove the identified failed or failing optical channel from further use. Thus, as shown in FIG. 5, in response to the fault of optical channel ch8 being detected, the routing of the active bus lanes L0-L7 is re-routed or switched such that bus lane L0 is now routed to the spared optical channel ch0, bus lane L1 is now routed to working optical channel ch1, and so on. It should be noted that the failed or failing optical channel ch8 in this example is not routed to or connected to any of the active bus lanes L0-L7.

It should be noted that, depending upon the particular optical channel that is determined to be failed or failing, not all routings of bus lanes to optical channels need to be re-routed or switched. For example, as shown in FIG. 5, if the failure of channel ch7 were detected, no re-routing of switching of the bus lane L7 is necessary since it is not routed to or coupled to the failed or failing optical channel ch7. Thus, only a subset of the bus lane to optical channel routings need to be re-routed or switched. In this depicted example, the routings of bus lanes L0-L6 to optical channels are re-routed or switched such that L0 is routed to ch0, L1 is routed to ch1, and so on with lane L6 being re-routed to optical channel ch6 and the routing of lane L7 to optical channel ch8 is maintained. As a result, the failed or failing optical channel ch7 is isolated and no longer utilized. Thus, in one illustrative embodiment, if the failure is detected in association with an optical channel M, then only the bus lane to optical channels for optical channels 0 to M need to be re-routed or switched while bus lane to optical channel routings for optical channels M+1 to N are not re-routed or switched, or vice versa depending upon the location of the spare optical channels. This re-routing or switching is performed by the channel router/switch 416, 446 in response to control signals from the service controller 426, 456.

As noted above, the channel router/switch may be implemented in a printed circuit board (PCB) between the optical transceiver and the SerDes module. In one illustrative embodiment, with a channel router/switch that is implemented in a PCB, the channel router/switch is comprised of a plurality of multiplexers (MUXs) that are arranged in a cascaded passive configuration. With this cascaded passive configuration or arrangement, the MUXs are cascaded such that path selected is controlled by a common selection setting on a front array of MUXs and back array of MUXs for simplified implementation. This cascaded passive configuration provides an improved signaling approach to providing the channel router/switch logic. This cascaded arrangement allows plural paths to spare optical channels using passive multiplexer (MUX) switches as a low cost solution. The low failure rate of MUX switches significantly improves system reliability from high laser failure rates. The cascading two multiplexers help remove stub effects from unused path routing which is detrimental to high speed transmission.

Figure 6:
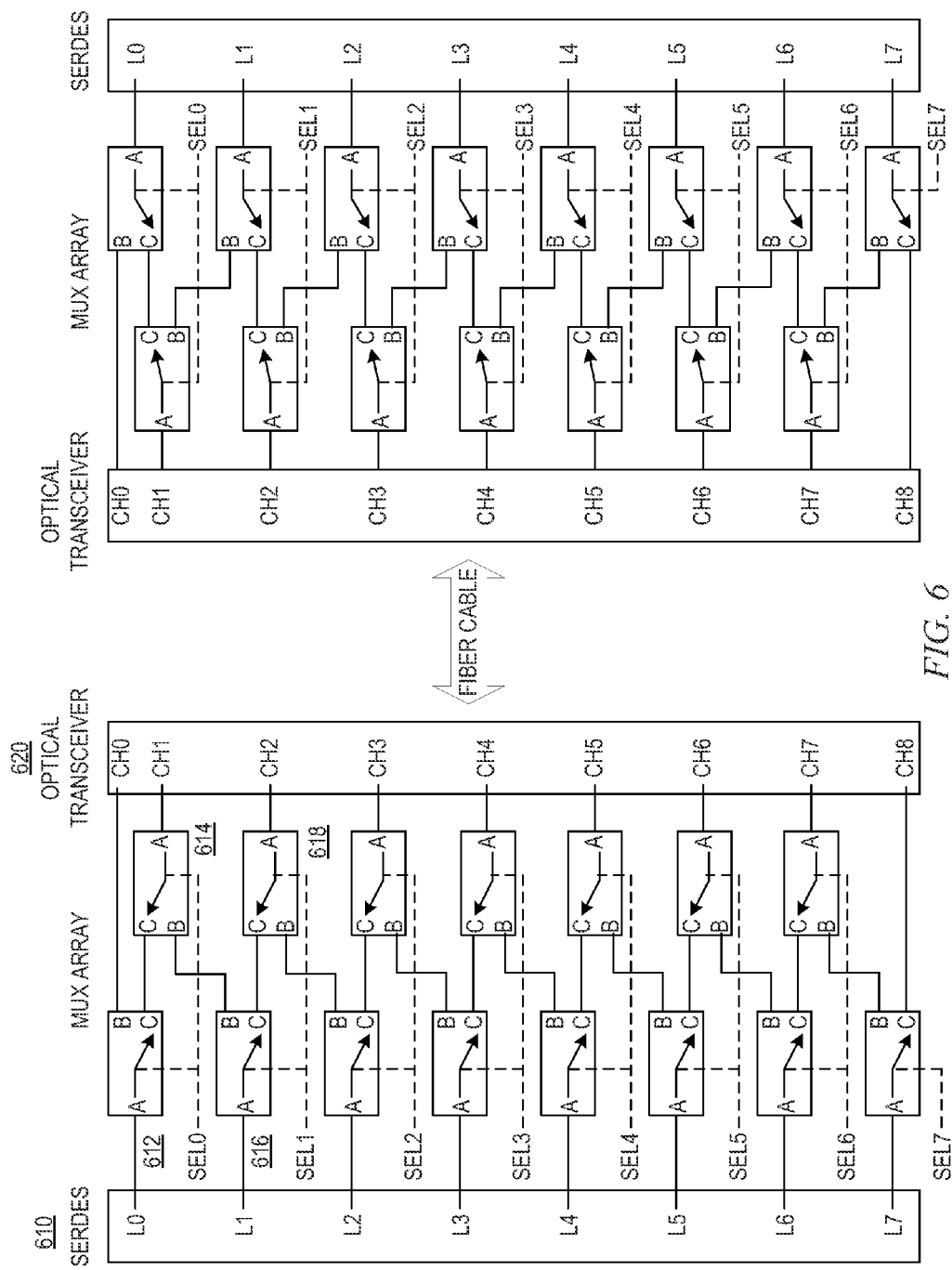
FIG. 6 illustrates one example of a cascaded passive MUX configuration of a channel router/switch in accordance with one illustrative embodiment.

FIG. 6 illustrates one example of a cascaded passive MUX configuration of a channel router/switch in accordance with one illustrative embodiment. The example shown in FIG. 6 is for a PCIe x8 optical bus configuration. As shown in FIG. 6, each connection between an active bus lane L0 to L7 of the SerDes module 610 is coupled to two optical channels, from optical channels ch0 to ch8 of the optical transceiver 620, via two multiplexers 612 (in a first MUX array), 614 (in a second MUX array) arranged in a cascaded configuration. Thus, a port A of a first multiplexer 612 is coupled to the active bus lane of the SerDes module 610, a port B is coupled to a first optical channel of the optical transceiver 620 or a port of a second multiplexer 614, and a third port C is coupled to a port C of the second multiplexer 614. The second multiplexer 614 has ports coupled to one or more first multiplexers and to an optical channel of the optical transceiver 620. Thus, for example, multiplexer 612 coupled to bus lane L0 via port A is further coupled to optical channel ch0 of the optical transceiver 620 via port B, and port C of multiplexer 614 via port C of the multiplexer 612. The multiplexer 614 is coupled to multiplexer 612 via port C and to optical channel ch1 of the transceiver 620 via port A. The multiplexer 614 is coupled to a first multiplexer 616 (in the second MUX array) of another associated bus lane L1 via port B of the multiplexer 614. Multiplexer 616 is further coupled to multiplexer 618 (in the first MUX array) via port C of multiplexer 616 which in turn is coupled to the optical channel ch2 via port A of the multiplexer 618. This configuration continues for each of the bus lanes L2 to L7 and optical channels ch3 to ch8.

As shown, each multiplexer in the cascaded arrangement receives a control select signal sel0 to sel7 to control the switching of the multiplexer. Thus, the logic may, for each bus lane L0 to L7 route the data signals to/from one of two possible optical channels ch0 to ch8. Thus, for example, bus lane L0 may be coupled to either optical channel ch0 or ch1, bus lane L1 may be coupled to either optical channel ch1 or ch2, bus lane L2 may be coupled to either optical channel ch2 or ch3, and so on. A similar arrangement is shown for the other I/O subsystem 650 as well.

FIG. 7 is an example of an optical channel usage table and corresponding multiplexer select control signal for various optical channel failures in accordance with one illustrative embodiment. The example in the table of FIG. 7 assumes a cascaded configuration or arrangement of multiplexers as illustrated in FIG. 6. Essentially, what is shown in FIG. 7 is that the select control signal is set to a low or 0 state in order for the corresponding multiplexer to switch to a B port. The select control signal is set to a high or 1 state to switch to the C port.

Figure 8:
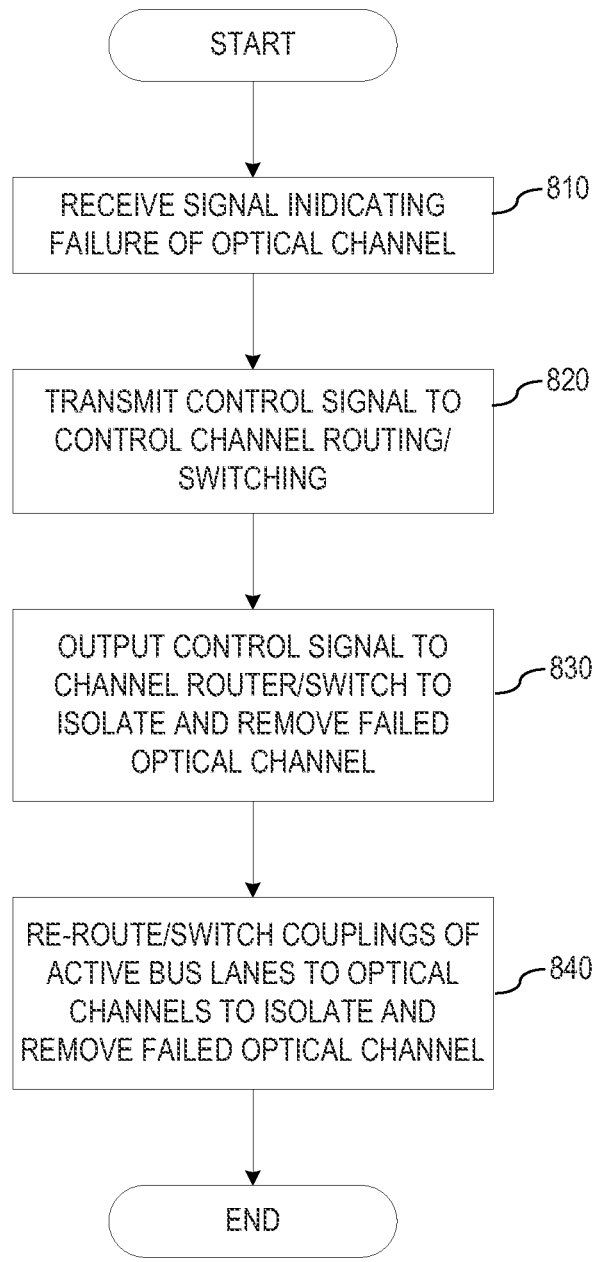
FIG. 8 is a flowchart outlining an example operation for performing optical channel sparing in accordance with one illustrative embodiment.

FIG. 8 is a flowchart outlining an example operation for performing optical channel sparing in accordance with one illustrative embodiment. The operation outlined in FIG. 8 may be implemented, for example, by a service controller logic and/or channel routing/switching controller provided in one or more field programmable gate arrays, system firmware, or software executed by one or more hardware processors. As shown in FIG. 8, the operation starts with receiving a signal indicating a failure or imminent failure of an optical channel of an optical transceiver (step 810). As noted above, this failure signal may be received from failure detection logic implemented in an optical transceiver of the I/O subsystem, for example, in response to the failure detection logic detecting a state of the optical channel meeting or exceeding one or more predetermined criteria indicative of a failed or failing optical channel. In some illustrative embodiments, this monitoring involves monitoring the power of the laser of the optical channel. In other illustrative embodiments, this monitoring involves monitoring bias alert signals. In still other illustrative embodiments, this monitoring comprises monitoring register state.

In response to receiving the failure signal indicating a particular optical channel as failed or failing, the service controller logic transmits a control signal to the channel routing/switching controller logic indicating which optical channel has or is failing (step 820). The channel routing/switching controller outputs a control signal to the channel router/switch to cause the channel router/switch to re-route or switch the couplings of bus lanes to optical channels such that the failed or failing optical channel is isolated and no longer utilized and a spare optical channel is utilized in its stead (step 830). As discussed above, depending upon which optical channel is detected to have failed or be failing, only a subset of the routings/connections between the bus lanes and the optical channels need be re-routed or switched.

In response to receiving the control signals from the channel routing/switching controller, the channel router/switch re-routes or switches the couplings of the bus lanes to optical channels to isolate and remove the failed or failing optical channel and utilize a spare optical channel (step 840). The operation then terminates.

Thus, the illustrative embodiments provide mechanisms for providing optical channel sparing which may be used with optical busses implementing industry standards such as PCI or PCIe, for example. The optical channel sparing reduces system performance degradation by providing spare optical channels that may be utilized when an optical channel is determined to have failed or is failing and thus, the bandwidth of the optical bus is maintained.

As noted above, it should be appreciated that the illustrative embodiments may take the form of an entirely hardware embodiment or an embodiment containing both hardware and software elements. In one example embodiment, aspects of the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus comprising:
   a bus comprising a plurality of active bus lanes;
   optical channel routing logic coupled to the bus;
   an optical bus comprising a plurality of optical channels, wherein the number of optical channels is greater than the number of active bus lanes;
   an optical transceiver coupled to the optical bus;
   a channel routing controller coupled to the optical channel routing logic and the optical transceiver;
   a service controller coupled to the optical transceiver and coupled to the channel routing controller; and
   register update logic coupled to the service controller and the optical transceiver, wherein the optical transceiver is configured to detect a failure of an optical channel in the plurality of optical channels, and wherein, in response to the optical transceiver detecting the failure of the optical channel of the optical bus:
   the channel routing controller is configured to send a control signal to the optical channel routing logic to control a routing of data signals between the active bus lanes of the bus and the optical channels of the optical bus;
   the optical channel routing logic is configured to route the data signals between the active bus lanes and the optical channels, based on the control signal, so as to remove the failed optical channel from further use and use a spare optical channel, in the plurality of optical channels, instead of the failed optical channel;
   the service controller detects the failure by monitoring a failure register of the optical transceiver;
   the service controller sends to the register update logic a control signal to load into the register update logic a multiplexer selection code adjusted for the failure;
   the service controller sends a channel routing control signal to the channel routing controller to instruct the channel routing controller to adjust channel routing in view of the failure; and
   the register update logic updates registers of optical channels of the optical transceiver based on the failure.

2. The apparatus of claim 1, wherein the optical bus is an optical bus that implements a Peripheral Component Interconnect (PCI) or Peripheral Component Interconnect Express (PCIe).

3. The apparatus of claim 1, wherein the channel routing logic comprises a plurality of multiplexers, and wherein the channel routing controller is configured to send the control signal to the optical channel routing logic at least by sending a multiplexer select control signal to at least a subset of multiplexers in the plurality of multiplexers to change a switching of the subset of multiplexers.

4. The apparatus of claim 1, wherein the optical transceiver is configured to detect the failure of the optical channel at least by monitoring at least one characteristic of the optical channel and comparing the at least one characteristic to a failure detection criteria that indicates a predetermined criteria indicative of a failure of the optical channel.

5. The apparatus of claim 4, wherein the at least one characteristic is at least one of a power of a laser associated with the optical channel, a bias alert signal output associated with the optical channel, or a register state of a fault register associated with the optical channel.

6. The apparatus of claim 1, wherein detecting the failure of the optical channel comprises comparing a laser power of a laser associated with the optical channel to a predetermined threshold power value and detecting the failure in response to the laser power of the laser falling below the predetermined threshold power value.

7. The apparatus of claim 1, wherein a bandwidth of the active bus lanes remains constant after detection of the failure of the optical channel due to the channel routing controller controlling the routing of the data signals between the active bus lanes and the optical channels.

8. The apparatus of claim 1, wherein the apparatus is an input/output (I/O) subsystem, and wherein the channel routing logic is integrated into one of a serializer/deserializer (SerDes) circuit of the I/O subsystem, integrated in the optical transceiver, integrated in a separate printed circuit board (PCB) from the channel routing controller and the optical transceiver, integrated in firmware of the I/O subsystem, or integrated in a field programmable gate array (FPGA) of the I/O subsystem.

9. The apparatus of claim 1, wherein the channel routing controller controls routing of data signals between the active bus lanes and the optical channels at least by switching an operation of at least one multiplexer of the channel routing logic from routing data signals through a first signal path through the at least one multiplexer to routing data signals through a second signal path through the at least one multiplexer, and wherein the channel routing logic comprises a plurality of multiplexers and the switching of the operation of at least one multiplexer comprises switching the operation of a sub-set of multiplexers within the plurality of multiplexers.

10. A computer program product comprising a computer readable storage medium having a computer readable program stored therein, wherein the computer readable program, when executed on a computing device, causes the computing device to:
   detect a failure of an optical channel in a plurality of optical channels of an optical bus;
   send a control signal to channel routing logic of an input/output (I/O) subsystem to control a routing of data signals between active bus lanes of the computing device and the plurality of optical channels of the optical bus in response to detecting the failure of the optical channel; and control routing of the data signals between the active bus lanes and the plurality of optical channels so as to remove the failed optical channel from further use and use a spare optical channel instead of the failed optical channel, wherein:

the number of optical channels in the plurality of optical channels is greater than the number of active bus lanes;

the computing device comprises an optical transceiver coupled to the optical bus, a channel routing controller coupled to the channel routing logic and the optical transceiver, a service controller coupled to the optical transceiver and the channel routing controller, and register update logic coupled to the service controller and the optical transceiver;

the computer readable program further causes the computing device to configure the service controller to: monitor a failure register of the optical transceiver; send, to the register update logic, a control signal to load into the register update logic a multiplexer selection code adjusted for the failure; and send a channel routing control signal to the channel routing controller to instruct the channel routing controller to adjust channel routing in view of the failure; and wherein the computer readable program further causes the computing device to configure the register update logic to update registers of optical channels of the optical transceiver based on the failure.

11. The computer program product of claim 10, wherein the channel routing logic comprises a plurality of multiplexers, and wherein controlling routing of the data signals comprises sending the control signal to the optical channel routing logic at least by sending a multiplexer select control signal to at least a subset of multiplexers in the plurality of multiplexers to change a switching of the subset of multiplexers.

12. The computer program product of claim 10, wherein the computer readable program causes the computing device to configure the optical transceiver to detect the failure of the optical channel at least by monitoring at least one characteristic of the optical channel and comparing the at least one characteristic to a failure detection criteria that indicates a predetermined criteria indicative of a failure of the optical channel.

13. The computer program product of claim 12, wherein the at least one characteristic is at least one of a power of a laser associated with the optical channel, a bias alert signal output associated with the optical channel, or a register state of a fault register associated with the optical channel.

* * * * *